United States Patent

Roussos et al.

[15] 3,639,264
[45] Feb. 1, 1972

[54] LIQUID LEAD STABILIZERS FOR VINYL CHLORIDE POLYMERS AND COPOLYMERS

[72] Inventors: Michel Roussos, Lyon; Yves Bourgeois, Paris, both of France

[73] Assignee: Melle-Bezons, Melle (Deux-Sevres), France

[22] Filed: Apr. 25, 1968

[21] Appl. No.: 724,274

[30] Foreign Application Priority Data

Apr. 27, 1967  France.....................................104340

[52] U.S. Cl. .......................252/400, 252/407, 260/45.75 R, 260/435
[51] Int. Cl. .........................................................C08f 45/62
[58] Field of Search ..............252/400, 407; 260/45.75, 435; 44/66

[56] References Cited

UNITED STATES PATENTS

| | | | |
|---|---|---|---|
| 3,002,943 | 10/1961 | Kebrich | 252/400 |
| 3,072,693 | 1/1963 | Szczepanek et al. | 260/435 |
| 3,317,436 | 5/1967 | Szczepanek et al. | 252/400 |
| 3,499,868 | 3/1970 | Roussos | 252/407 |

Primary Examiner—Richard D. Lovering
Assistant Examiner—Irwin Gluck
Attorney—McDougall, Hersh, Scott & Ladd

[57] ABSTRACT

Stabilization of vinyl chloride polymers and copolymers against heat or light decomposition and composition for use in the practice of same wherein the composition is formed of a solution of a basic lead salt having the general formula (R-COO)$_2$Pb.nPbO, in which R is a branched-chain alkyl radical having from seven to 12 carbon atoms and $n$ is a number of from 0.5 to 2 and in which solution is in a hydrocarbon solvent having a boiling point within the range of 100° to 180° C. or in a plasticizer ester.

12 Claims, No Drawings

LIQUID LEAD STABILIZERS FOR VINYL CHLORIDE POLYMERS AND COPOLYMERS

This invention relates to the stabilization of vinyl chloride polymers and copolymers against decomposition in the presence of light and heat and to a new and improved stabilizer for use in same.

It is known that vinyl chloride polymers and copolymers decompose under the action of light and heat. This phenomenon results in discoloration of the product and degradation of its mechanical properties. It is for this reason that it becomes necessary to effect stabilization of such products before cure. More particularly, it is known that polyvinyl chloride and copolymers thereof can be protected by means of lead stabilizers.

Conventional lead stabilizers are mainly basic lead salts derived from organic or inorganic acids. They are available, for the most part, in solid form such as powders or pastelike form. The use of powdered lead stabilizers necessitates severe safety precautions. To avoid such inconveniences, it has been proposed to add various amounts of plasticizer so as to reduce dusting and produce a paste. Such pastes have a strong tendency to decant and are therefore difficult to measure out, whereby their use becomes impractical.

Liquid lead stabilizers are known. Conventional stabilizers of the type described are neutral salts derived from organic acids, i.e., in contradistinction with the so-called "basic" solid lead stabilizers, they contain no basic PbO group capable of acting as an acceptor for the hydrochloric acid formed by the decomposition of the polymer and, accordingly, are less efficient. These liquid salts can be represented by the formula (R-COO)$_2$Pb, whereas most of the solid lead salt stabilizers are represented by the formula (R'COO)$_2$Pb.nPbO, $n$ being from 1 to 4. The liquid form of these products is obtained by the use of organic acids of special constitution and of solvents.

An object of this invention is to provide a lead stabilizer which is both basic and in liquid form.

In accordance with the practice of this invention, use is made of lead salts of the general formula (RCOO)$_2$Pb.nPbO in which R is a branched-chain alkyl radical having from seven to 12 carbon atoms and $n$ is a number, integer or not, of from 0.5 to 2.

The acids suitable for preparing the lead salts used in accordance with this invention are organic acids, the basic lead salts of which can be dissolved in organic media, i.e., solvents or plasticizers. The solubility of these salts in such organic media is a function of the branched character of the hydrocarbon chains of the acid radicals. The presence of a branched-chain and a minimum length of the chain are important. The following are given by way of illustration, but not by way of limitation, namely: 3,5,5-trimethyl hexanoic acid, the commercial isononanoic acid which contains above 90 percent of 3,5,5-trimethyl hexanoic acid, and the branched-chain, saturated, aliphatic acids containing eight to 10 carbon atoms in the molecule, as produced by the Oxo synthesis.

The salts used in accordance with the invention are produced by reacting the above-defined acids with a lead oxide or hydroxide, preferably litharge. The reaction is carried out in the presence of a liquid, organic water entrainer of conventional kind, which azeotropically entrains the reaction water. Then, the water entrainer is displaced and replaced by a hydrocarbon solvent or a plasticizer of higher boiling point. For this purpose there may be used, for example, a hydrocarbon solvent boiling from 100° to 180° C., such as White Spirit, or a higher dialkyl phthalate, such as di (2-ethyl hexyl) phthalate, or didecyl phthalate produced by the Oxo synthesis, or 2-ethyl hexyl epoxystearate. It is also possible to further add for admixture with the solvent a 2-alkoxyethanol such as 2-butoxyethanol or a 2-alkoxypropanol, or dipropylene glycol, in an amount to make up 3 percent to 25 percent by weight of its mixture, to reduce the viscosity and make the dissolution easier. The products of the invention are suitable to prepare synergistic compositions which especially may contain a chelating agent, such as an organic phosphite ester, more particularly diphenyl monodecyl phosphite and/or an organic antioxidant, such as a phenol.

The use of the products of the invention allows sheets or other articles having initially a high transparency and a high stability towards heat to be obtained, whether such sheets or articles have been prepared from a polyvinyl chloride resin produced by "mass process," or by "suspension process," or by "emulsion process." The products of the invention can also be used as "kickers" in plastisol compositions for polyvinyl chloride foam production.

EXAMPLE 1

This example illustrates the preparation of monobasic lead salt of Oxo $C_8$–$C_{10}$ acids, dissolved in di(2-ethyl hexyl) phthalate.

The characteristics of the Oxo $C_8$–$C_{10}$ acids are as follows:

| | |
|---|---|
| Molecular weight reckoned from the acidity | 168 |
| Specific weight at 20° C. | 0.908 |
| Boiling range at atmospheric pressure, from 5 to 95% distilled off | 228° to 244° C. |
| Viscosity at 20° C. | 10 centipoises |
| Iodine number | ≤ 1 |

Into a reaction vessel of 3 liters capacity there is introduced, by weight, 250 parts of gasoline E as a water-entrainer, 336 parts (2 moles) of Oxo $C_8$–$C_{10}$ acids and, at a temperature of 50° C., 226 parts (1 mole) of litharge. The mixture is heated to and maintained at 100° C. for 1 hour. Then, after cooling, there is added 171 parts of dipropylene glycol and a paste made of 226 parts of litharge and 30 parts of isobutanol. The resulting mixture is boiled under reflux for 2 hours, then the water is distilled off azeotropically. Twenty-four parts of aqueous phase is collected. The gasoline is distilled off under an absolute pressure of 80 mm. Hg. When the temperature of the mixture in the vessel reaches 80° C., there is gradually added thereto an amount of di(2-ethyl hexyl) phthalate to keep the mixture fluid. The distillation is continued up to a temperature of 120° C. Addition of di(2-ethyl hexyl) phthalate is then continued while the temperature decreases. Seven hundred and seventy-one parts of di(2-ethyl hexyl) phthalate will have been introduced. The mixture is filtered under pressure and there is obtained 1,688 parts of a liquid having the following characteristics:

| | |
|---|---|
| Lead (% by weight) | 23.7 (calculated: 24.1) |
| Viscosity at 25° C. | 4.1 poises. |

EXAMPLE 2

This example illustrates the preparation of a similar lead salt but with 1.5 PbO, in substantially the same manner as in Example 1 but using the following substances (parts by weight):

| | |
|---|---|
| Gasoline E | 220 parts |
| Oxo $C_8$–$C_{10}$ acids | 296 parts (1.76 moles) |
| Litharge | 497 parts (2.2 moles) |
| Isobutanol | 27 parts |
| Dipropylene glycol | 173 parts |
| Di (2-ethyl hexyl) phthalate | 776 parts |

There is finally obtained 1,717 parts of a liquid having the following characteristics:

| | |
|---|---|
| Lead (% by weight) | 25.5 (calculated: 26.4) |
| Viscosity at 25° C. | 4.15 poises. |

EXAMPLE 3

This example illustrates the preparation of the same lead salt as in Example 2, dissolved in 2-ethyl hexyl epoxystearate.

The operation is carried out substantially as described in the foregoing examples, but the 2-ethyl hexyl epoxystearate is introduced at the end of the distillation under reduced pressure.

The starting substances are as follows (parts by weight):

| | |
|---|---|
| Gasoline E | 220 parts |
| Oxo $C_8$–$C_{10}$ acids | 296 parts (1.76 moles) |
| Litharge | 497 parts (2.2 moles) |
| Isobutanol | 27 parts |
| Dipropylene glycol | 173 parts |
| 2-ethyl hexyl epoxystearate | 776 parts |

There is finally obtained 1,697 parts of a liquid having the following characteristics:

| | |
|---|---|
| Lead (% by weight) | 24.9 (calculated: 26.4) |
| Viscosity at 25° C. | 1.8 poises. |

EXAMPLE 4

This example illustrates a composition containing diphenyl monodecyl phosphite. This composition is obtained by mixing, at 60° C., 100 parts by weight of the final liquid produced in Example 3 with 45 parts by weight of diphenyl monodecyl phosphite. The characteristics of the composition are as follows:

| | |
|---|---|
| Lead (% by weight) | 17.2 |
| Viscosity at 25° C. | 0.9 poises. |

EXAMPLE 5

This example illustrates the preparation of monobasic lead salt of isononanoic acid, dissolved in Oxo didecyl phthalate.

The characteristics of the isononanoic acid used are as follows:

| | |
|---|---|
| Molecular weight reckoned from the acidity | 161 |
| Specific weight at 20° C. | 0.895 |
| Color (Hazen) | 30 |
| Boiling range at atmospheric pressure, from 5 to 95% distilled off | 230° to 240° C. |
| Viscosity at 20° C. | 11 centipoises. |

The operation is carried out substantially as described in Example 1, the starting substances being as follows (parts by weight):

| | |
|---|---|
| Gasoline E | 124 parts |
| Isononanoic acid | 161 parts (1 mole) |
| Litharge | 226 parts (1 mole) |
| Isobutanol | 15 parts |
| Dipropylene glycol | 84 parts |
| Oxo didecyl phthalate | 377 parts |

There is finally obtained 838 parts of a liquid having the following characteristics:

| | |
|---|---|
| Lead (% by weight) | 23.3 (calculated: 24.7) |
| Viscosity at 25° C. | 4.9 poises. |

EXAMPLE 6

This example illustrates comparative stabilization experiments.

The following resinous mass was used (parts by weight):

| | |
|---|---|
| Polyvinyl chloride produced by "mass process" ("Lucovyl" GB 9550) | 100 parts |
| Di-isooctyl phthalate | 50 parts |

The stabilizers used in the various mixtures tested were as follows:

| Mixture No. | Stabilizer | |
|---|---|---|
| | Kind | Parts |
| 1 (check-test) | None | |
| 2 | Dibasic lead phthalate | 0.5 |
| 3 | Dibasic lead phthalate | 1 |
| 4 | Dibasic lead stearate | 0.8 |
| 5 | Dibasic lead stearate | 1.6 |
| 6 | Composition (A) (see below) | 2.2 |
| 7 | Composition (A) (see below) | 4.4 |
| 8 | Composition (B) (see below) | 2.7 |
| 9 | Composition (B) (see below) | 5.4 |
| 10 | Composition (C) (see below) | 3.2 |
| 11 | Composition (C) (see below) | 6.4 |

Stabilizing composition (A) comprises:

1 part by weight of diphenenyl monodecyl phosphite 3 parts by weight of monobasic lead salt of Oxo $C_8$–$C_{10}$ acids, dissolved at 45 percent concentration in a mixture of White Spirit and dipropylene glycol.

Stabilizing composition (B) comprises:

2 parts by weight of 2-ethyl hexyl epoxystearate 3 parts by weight of monobasic lead salt of Oxo $C_8$–$C_{10}$ acids, dissolved at 45 percent concentration in a mixture of White Spirit and dipropylene glycol.

Stabilizing composition (C) comprises:  2 parts by weight of 2-ethyl hexyl epoxystearate  2 parts by weight of 1.5 basic lead salt of Oxo $C_8$–$C_{10}$ acids, dissolved at 45 percent concentration in a mixture of White Spirit and dipropylene glycol.

The amounts of stabilizers used are such that they represent the same lead content in mixtures Nos. 2, 4, 6, 8 and 10 and twice this content in mixtures Nos. 3, 5, 7, 9 and 11.

The curing of the mixtures is performed in Berstorff cylinders. The heat stability tests are carried out at 180° C. in a heated room with natural ventilation. The results of the tests, given in Table I, are expressed with reference to an iodine scale.

TABLE I

| Time (hours) | Mixtures | | | | | | | | | | |
|---|---|---|---|---|---|---|---|---|---|---|---|
| | 1 | 2 | 3 | 4 | 5 | 6 | 7 | 8 | 9 | 10 | 11 |
| 0 | 5 | 0 | 0 | 0 | 0 | 0 | 0 | 0 | 0 | 0 | 0 |
| ¼ | 30 | 30 | 30 | 0 | 0 | 0 | 0 | 0 | 0 | 0 | 0 |
| ½ | 200 | 40 | 40 | 5 | 2 | 0 | 0 | 5 | 2 | 5 | 2 |
| ¾ | 500 | 50 | 40 | 10 | 5 | 9 | 0 | 5 | 2 | 5 | 2 |
| 1 | 1,000 | 100 | 50 | 30 | 5 | 20 | 0 | 30 | 5 | 10 | 5 |
| 1¼ | | 100 | 50 | 50 | 5 | 20 | 0 | 30 | 5 | 20 | 5 |
| 1½ | | 900 | 800 | 1,000 | 10 | 1,000 | 20 | 1,000 | 5 | 50 | 5 |
| 1¾ | | 900 | 800 | | 20 | | 100 | | 5 | 50 | 5 |
| 2 | | 1,000 | 900 | | 1,000 | | 1,000 | | 10 | 1,000 | 10 |
| 2¼ | | | | | | | | | 20 | | 20 |
| 2½ | | | | | | | | | 1,000 | | 500 |

It is thus seen that, for a same lead content, the three liquid compositions, A, B, and especially C, exhibit better results than the check-mixture and the mixtures stabilized with dibasic lead phthalate or dibasic lead stearate.

EXAMPLE 7

Experiments similar to those of example 6 are carried out, but there is substituted for the polyvinyl chloride produced by "mass process" a polyvinyl chloride produced by "suspension process," namely, "Lucovyl" GS 1200. The results of the tests are given in Table II.

TABLE II

| Time (hours) | Mixtures | | | | | | | | | | |
|---|---|---|---|---|---|---|---|---|---|---|---|
| | 1 | 2 | 3 | 4 | 5 | 6 | 7 | 8 | 9 | 10 | 11 |
| 0 | 0 | 0 | 0 | 0 | 0 | 0 | 0 | 0 | 0 | 0 | 0 |
| 1/4 | 30 | 20 | 20 | 0 | 2 | 0 | 0 | 0 | 0 | 0 | 0 |
| 1/2 | 500 | 50 | 50 | 10 | 5 | 0 | 0 | 5 | 2 | 5 | 2 |
| 3/4 | 750 | 50 | 50 | 20 | 10 | 2 | 0 | 5 | 5 | 5 | 5 |
| 1 | 900 | 800 | 50 | 20 | 10 | 20 | 0 | 10 | 10 | 20 | 10 |
| 1 1/4 | 1,000 | 900 | 100 | 1,000 | 10 | 50 | 5 | 50 | 10 | 50 | 10 |
| 1 1/2 | | 1,000 | 500 | 1,000 | 10 | 100 | 10 | 50 | 10 | 50 | 10 |
| 1 3/4 | | | 900 | | 20 | 1,000 | 20 | 1,000 | 10 | 200 | 10 |
| 2 | | | 1,000 | | 100 | | 30 | | 20 | 500 | 10 |
| 2 1/4 | | | | | 1,000 | | 1,000 | | 50 | 1,000 | 20 |
| 2 1/2 | | | | | | | | | 200 | | 20 |
| 2 3/4 | | | | | | | | | 900 | | 150 |
| 3 | | | | | | | | | 1,000 | | 200 |

It is still seen that compositions A, B and C exhibit better results than the other ones.

EXAMPLE 8

Experiments similar to those of Example 6 are carried out, but there is substituted for the polyvinyl chloride produced by "mass process" a polyvinyl chloride produced by "emulsion process," namely, "Lucovyl" PE 1805. The results of the tests are given in Table III.

TABLE III

| Time (hours) | Mixtures | | | | | | | | | | |
|---|---|---|---|---|---|---|---|---|---|---|---|
| | 1 | 2 | 3 | 4 | 5 | 6 | 7 | 8 | 9 | 10 | 11 |
| 0 | 5 | 2 | 0 | 0 | 0 | 0 | 0 | 0 | 0 | 0 | 0 |
| 1/4 | 200 | 50 | 5 | 2 | 5 | 0 | 0 | 0 | 0 | 0 | 0 |
| 1/2 | 900 | 200 | 20 | 50 | 20 | 20 | 5 | 50 | 20 | 20 | 10 |
| 3/4 | 1,000 | 1,000 | 20 | 200 | 50 | 50 | 5 | 75 | 30 | 50 | 20 |
| 1 | | | 400 | 1,000 | 200 | 1,000 | 30 | 1,000 | 75 | 500 | 50 |
| 1 1/4 | | | | | 500 | | 500 | | 100 | 1,000 | 50 |
| 1 1/2 | | | | | 1,000 | | 1,000 | | 1,000 | | 250 |
| 1 3/4 | | | | | | | | | | | 1,000 |

It is still seen that compositions A, B and C exhibit better results than the other ones.

In the foregoing examples the Lucovyl resins are marketed in France by Pechiney-Saint-Gobain.

It will be apparent from the foregoing that we have provided a new and improved stabilizer and composition for vinyl chloride polymers and copolymers.

It will be understood that changes may be made in the details of formulation and application without departing from the spirit of the invention, especially as defined in the following claims.

We claim:

1. In solution in a hydrocarbon solvent having a boiling point within the range of 100° to 180° C. or in a plasticizer ester, for stabilization of vinyl chloride polymers and copolymers, an effective amount of a basic lead salt having the general formula $(RCOO)_2Pb.nPdO$ in which R is a branched-chain alkyl radical having from seven to 12 carbon atoms and $n$ is a number from 0.5 to 2.

2. A solution as claimed in claim 1 in which the salt is derived from 3,5,5-trimethyl hexanoic acid.

3. A solution as claimed in claim 1 in which the salt is derived from isononanoic acid.

4. A solution as claimed in claim 1 in which the salt is derived from a mixture of acids having from eight to 10 carbon atoms and produced by the Oxo synthesis.

5. A solution as claimed in claim 1 in which the salt has the general formula $(RCOO)_2Pb.PbO$.

6. A solution as claimed in claim 1 in which the salt has the general formula $(RCOO)_2Pb.1.5PbO$.

7. A solution as claimed in claim 1 in which the solvent is mineral spirits.

8. A solution as claimed in claim 1 in which the solvent is a higher dialkyl phthalate.

9. A solution as claimed in claim 1 in which the solvent is 2-ethyl hexyl epoxystearate.

10. In solution in a hydrocarbon solvent having a boiling point within the range of 100° to 180° C. or in a plasticizer ester, for stabilization of vinyl chloride polymers and copolymers, an effective amount of a basic lead salt having the general formula $(RCOO)_2Pb.nPbO$ in which R is a branched-chain alkyl radical having from seven to 12 carbon atoms and $n$ is a number from 0.5 to 2, and a compound selected from the group consisting of 2-alkoxyethanol, 2-alkoxypropanol and dipropylene glycol present in an amount of 3 to 25 percent by weight of this mixture with the solvent.

11. A solution as claimed in claim 10 which includes a diaryl alkyl phosphite ester.

12. A solution as claimed in claim 1 which includes an organic antioxidant in the form of a phenol.

* * * * *